United States Patent [19]
Gottschalk

[11] Patent Number: 5,956,253
[45] Date of Patent: Sep. 21, 1999

[54] CAMERA CONTROLLED CNC APPARATUS FOR PROCESSING BLANKS

[75] Inventor: Charles E. Gottschalk, Whitehouse, Ohio

[73] Assignee: Glassline Corporation, Perrysburg, Ohio

[21] Appl. No.: 08/926,124

[22] Filed: Sep. 9, 1997

[51] Int. Cl.⁶ .............................. G06F 19/00; H04N 7/18; G01B 5/004
[52] U.S. Cl. .............................. 364/474.28; 364/474.08; 348/95; 33/503
[58] Field of Search ................. 364/474.28, 470.05, 364/474.06, 474.08, 474; 348/95; 33/503

[56] References Cited

U.S. PATENT DOCUMENTS

| | | | |
|---|---|---|---|
| 4,737,918 | 4/1988 | Langlois et al. | 364/474.06 |
| 5,172,326 | 12/1992 | Campbell, Jr. et al. | 364/470.05 |
| 5,185,959 | 2/1993 | Ikola et al. | 451/178 |
| 5,367,834 | 11/1994 | Delventhal | 451/285 |
| 5,423,717 | 6/1995 | Boaz | 451/449 |
| 5,454,748 | 10/1995 | Gottschald | 451/41 |
| 5,517,420 | 5/1996 | Kinsman et al. | 364/474.08 |
| 5,588,899 | 12/1996 | Gottschald | 451/5 |
| 5,604,677 | 2/1997 | Brien | 364/474.28 |
| 5,659,479 | 8/1997 | Duley et al. | 364/474.08 |
| 5,768,137 | 6/1998 | Polidoro et al. | 364/474.28 |

*Primary Examiner*—William Grant
*Assistant Examiner*—Carolyn T. Baumgardner
*Attorney, Agent, or Firm*—Emch, Schaffer, Schaub & Porcello Co.

[57] ABSTRACT

This device is a computer numerically controlled (CNC) machine tool such as an edge grinding apparatus. More specifically, the device is a video controlled CNC apparatus for processing blanks such as a glass sheet. The device uses a video camera and monitor to program the path of the grinding wheel. The system requires a CNC machine, video camera, a video monitor, a vision board and software to calculate the offset parameters.

18 Claims, 6 Drawing Sheets

CAMERA CONTROLLED CNC APPARATUS FOR PROCESSING BLANKS

TECHNICAL FIELD

This apparatus relates to computer numerically controlled (CNC) machine tools such as an edge grinding apparatus. More specifically, the invention relates to a video controlled CNC apparatus for processing blanks such as a glass sheet.

BACKGROUND ART

Machine tools such as an edge grinding apparatus include at least one grinding wheel, at least one rotatable holder for a blank, and at least one CNC device for controlling the grinding of the blank according to selected specification. The CNC machine tool may include a multi-axis, linear (X, Y axis) holder instead of a rotatable holder. In either case, a cutting tool moves relative to the blank or workpiece under the control of a programmable controller, including a computer program. The cutting tool is not restricted to standard turning or milling cutters, but also includes all mechanical, electronic and/or electro-mechanical devices used to modify the shape and/or properties of the workpiece. Examples of cutting tools include: end-mills, turning tools, grinding wheels, laser cutting beams, plasma beams and punch tools.

In a standard CNC glass grinding machine, an operator must adjust the CNC parameters to allow the CNC machine to grind the part where it is located on the machine. This can be a slow process and is difficult for many operators to master. The prior art process requires the operator to grind a part, check the part for even grind then adjust the X, Y and rotation offset parameters on the CNC control to move the CNC program to match the part location. This normally requires many iterations at about 30 to 60 seconds per pass. Operators can easily make errors that may damage the machine or grinding tool and make the process take much longer. Also, operators may make imperfect adjustments during set up causing excess tool wear, lower throughput and lower yields.

U.S. Pat. No. 5,588,899 discloses one solution to this problem. The apparatus of this patent is an opto-electronic device for positioning eye glass or spectacle lenses in a CNC grinding device. The opto-electronic detecting device includes a CCD (charge coupled device) camera, wherein the CCD camera is connected to a first control unit that includes an electronic picture processing and evaluating system cooperating with a second control unit. The CCD camera detects markings on the lens blank and the first and the second control units cooperate for positioning the lens blank on the holder. The system requires the manufacturer of the lens blank to mark each blank. If the blanks are not premarked, a separate marking is necessary.

DISCLOSURE OF INVENTION

The device of this invention uses a video camera and monitor to program the path of the grinding wheel rather than position the blank in the CNC grinding device. No pre-marking or separate processing steps are needed. The system requires a CNC machine, a video camera, a video monitor, a vision board and software to calculate the offset parameters. An operator must initiate a load cycle. Once the part is loaded on the CNC machine, the operator must start the measurement cycle. The measurement cycle will move the camera along the program path, stop at each of the checkpoints, and then take a still picture of the glass. The vision system software will find the edge of the glass and report the position to the CNC control. The control will continue this cycle through all the checkpoints. When the part path is complete the control will calculate the required offsets. Thereafter, the system will process additional blanks automatically without repeated adjustments for each blank.

BEST MODE OF CARRYING OUT INVENTION

The CNC machine tool, video camera and monitor are standard items, but the use of the vision system to control the path of the cutting tool in CNC machine tools is new. Software calculates the CNC offsets for the machine control. The vision system calculates the intersection of a minimum of two X plane and two Y plane programmed gridlines with the part perimeter. The CNC software must then calculate the real position of the intersections as compared to the positions in the camera. The speed of the system depends on the speed of the vision system and the communications between vision system and the CNC. The resolution of the data depends on the camera lens magnification and vision system resolution.

The vision system may be a standard vision system that calculates the intersection points and passes the information to the CNC on a communication line. The vision system could also be a PC video capture board installed in the CNC controller, If so, the CNC software also calculates the intersection of the grid lines with the edge of the shape. Installing a PC video capture board in the CNC will increase the speed of the process.

The software operation is as follows.

1. User initiates measurement of the part.
2. The control positions the camera over the part.
3. The control initiates a frame grab from the camera.
4. The control calculates a number of points of the edge of the glass; e.g. 4 points, using the picture and calibration numbers for the camera and stores the data to disk.
5. The control calculates a new position to place the camera.
6. The control positions the machine over the next point.
7. The control repeats steps 3 and 6 until the start point is reached.
8. The control initiates on optimize sequence to reduce the measured points to arcs and lines that can be used to control the machine in production.

Figure 1:
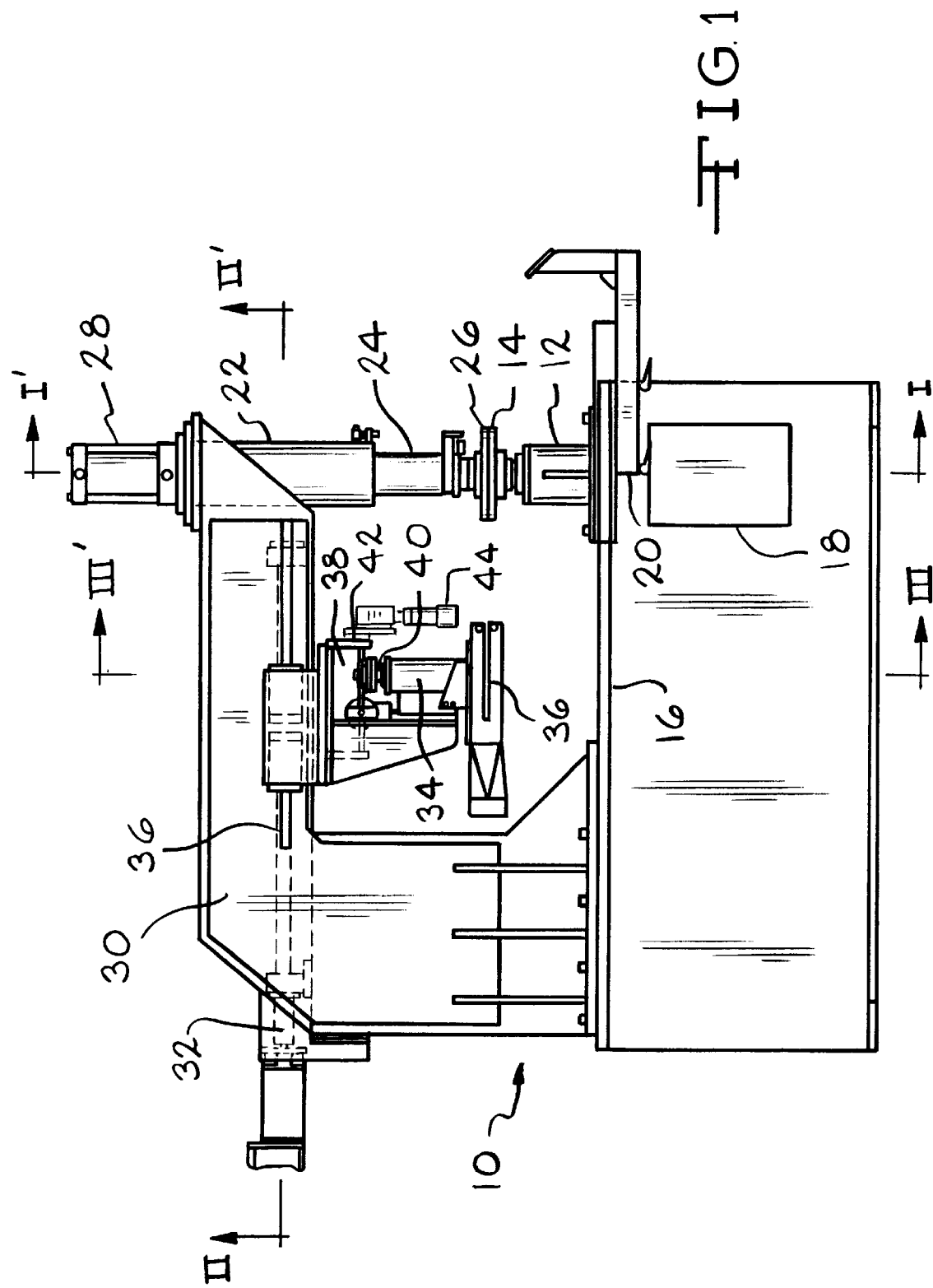
FIG. 1 is a side elevational view of an edge grinding apparatus according to the present invention having a rotatable holder.

FIG. 1 is a side elevational view of CNC edge grinding apparatus 10. Apparatus 10 subjects a generally planar article or blank S such as a sheet of glass to an edge grinding operation in an endless pattern around the periphery of the article. Blank S may have an irregular shape. Rotatable table 12 includes clamp 14. Frame 16 supports table 12, as well as the other components of CNC apparatus 10. Servo motor 18 drives or rotates table 12 through drive shaft 20 which connects motor 18 to table 12. Motor 18 rotates table 12 and blank S 360° about the I-I' axis. Lift cylinder 22 houses lift ram 24 which connects to clamp 26. Cylinder 28 raises and lowers ram 24 and clamp 26 in a vertical direction to predetermined set points along I-I' axis. Clamp 14 and clamp 26 sandwich blank S therebetween when cylinder 28 lowers clamp 26 to hold blank S in position against clamp 14.

Frame 16 also supports frame 30 and frame 30 in turn supports lift cylinder 22, servo motor 32 and edge grinder assembly 34. Servo motor 32 is connected to assembly 34 by drive shaft 36. Motor 32 moves assembly 34 horizontally on a straight line towards and away from blank S along the II-II' axis.

Edge grinder assembly 34 includes grinding wheel 36 and grinding motor 38. Motor 38 is rotatably connected to wheel 36 through drive shaft 40. Motor 38 rotates wheel 36 in a complete circle 360° about the III-III' axis.

Housing 42 surrounds motor 38. Housing 42 has an outside surface and video camera 44 is attached to the outside surface of housing 42 with appropriate fasteners.

Figure 2:
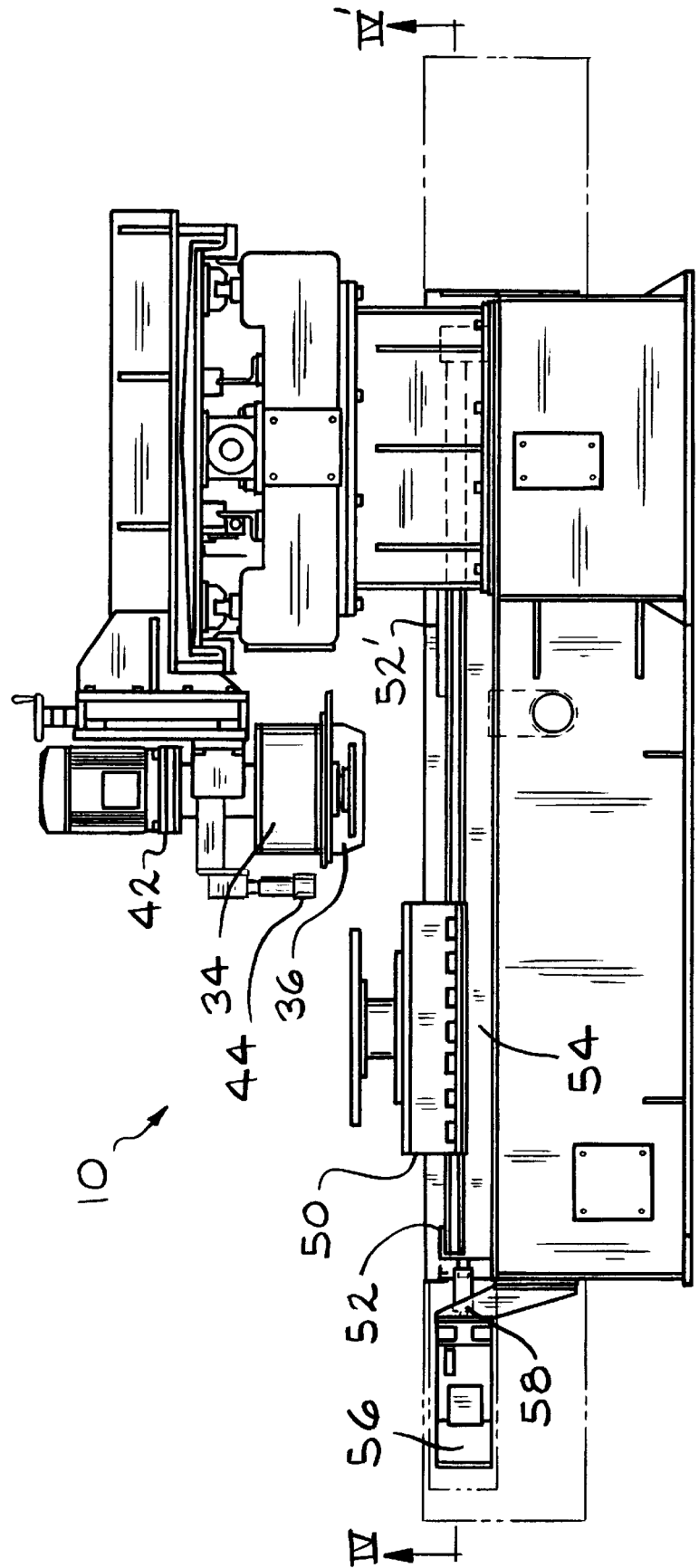
FIG. 2 is a side elevational view of an edge grinding apparatus according to the present invention having a multi axis, linear holder
Figure 3:
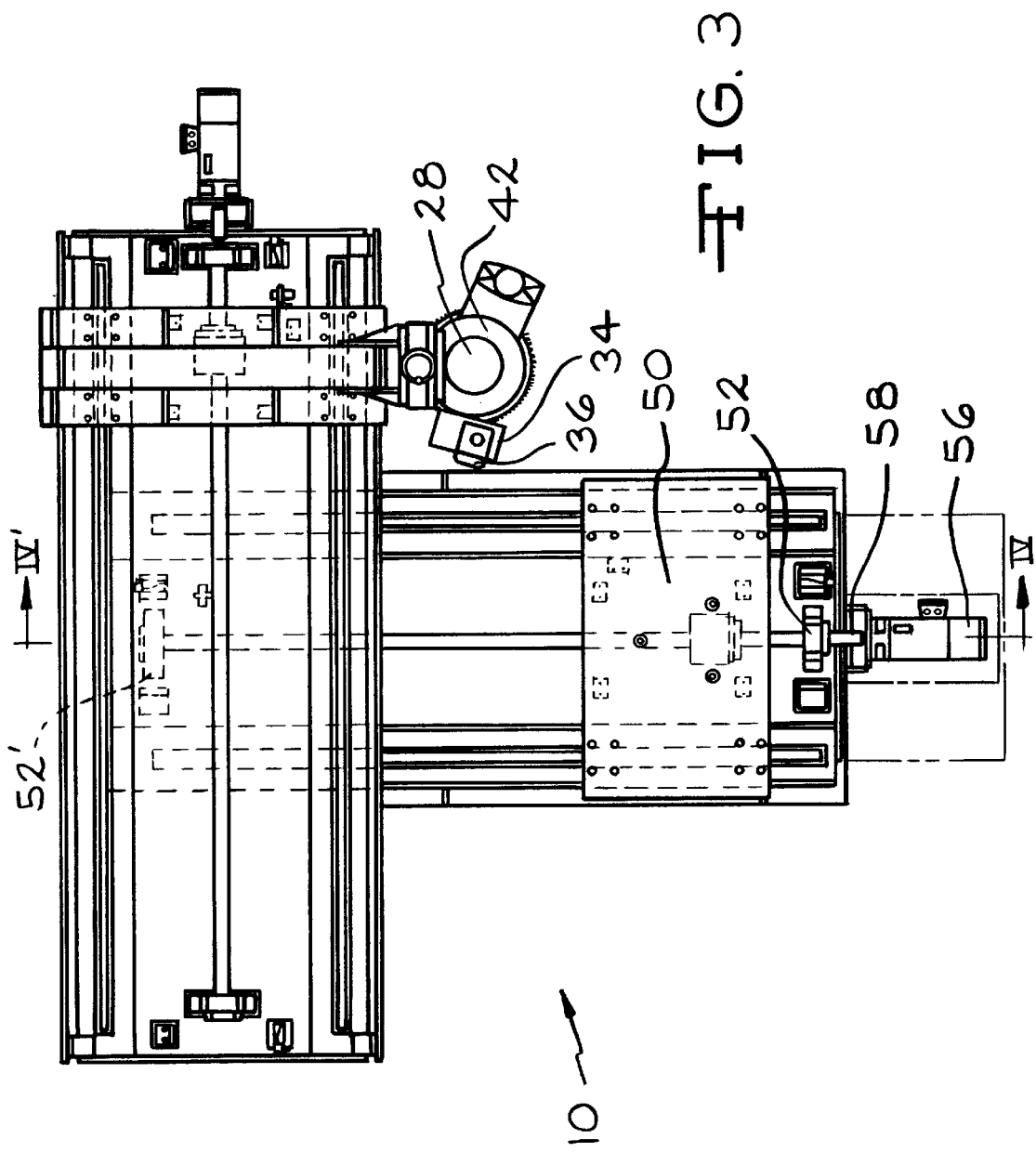
FIG. 3 is a top elevational view of the apparatus of FIG. 2.

FIGS. 2 and 3 shows CNC edge grinding apparatus 10 adapted for lateral, linear movement of a blank towards grinder assembly 34. Rotatable table 12 and its components are replaced with load table 50. Positive stops 52 and 52' are located on frame 54 which carries table 50. Motor 56 connects to table 50 through drive 58. Motor 56 moves table 50 back and forth horizontally in a straight line along IV-IV' axis between stops 52 and 52'.

Figure 4:
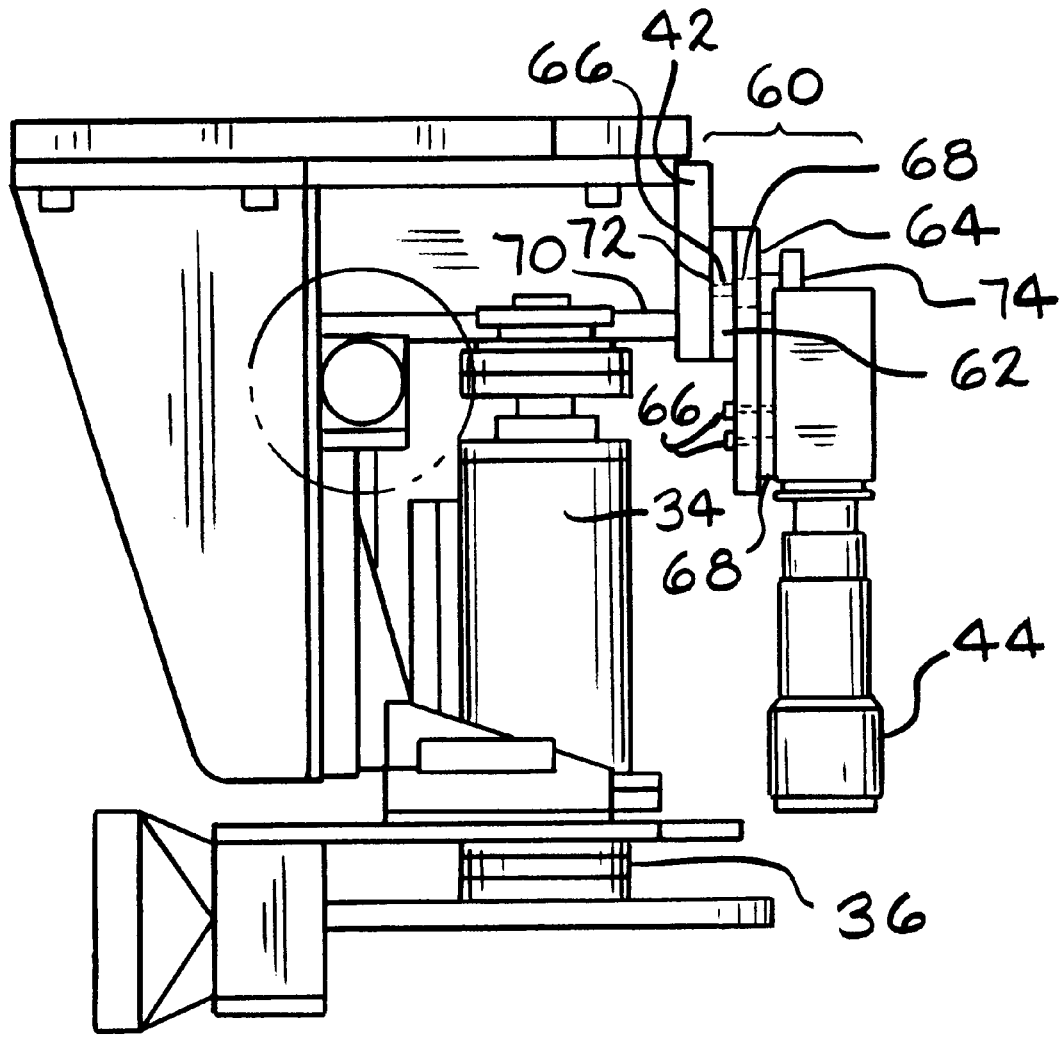
FIG. 4 is a fragmentary.side view of FIG. 1 showing the video camera and fastener in greater detail.

FIG. 4 shows camera 44 mounted on quick disconnect fastener 60. This keeps camera 44 clean during production. Quick connect 60 uses two plates 62 and 64. One is mounted to camera 44 and one to housing 42. Precision alignment pins 66 mounted to camera plate 62 and precision holes 68 in machine plate 64 make camera placement repeatable within ±0.001" (0.025 mm). Machine plate 64 is slotted so the camera position can be adjusted during calibration. The center of camera 44 may be aligned with ±0.002" (0.05)mm of the center line of the spindle. The distance from the center of wheel 34 is measured within 0.001".

Camera 44 is electrically disconnected with BNC connector 70 on 75 ohm coax cable 72 for the video signal and a DIN5 connector 74 on 20 gage twisted pair of the camera power.

Figure 5:
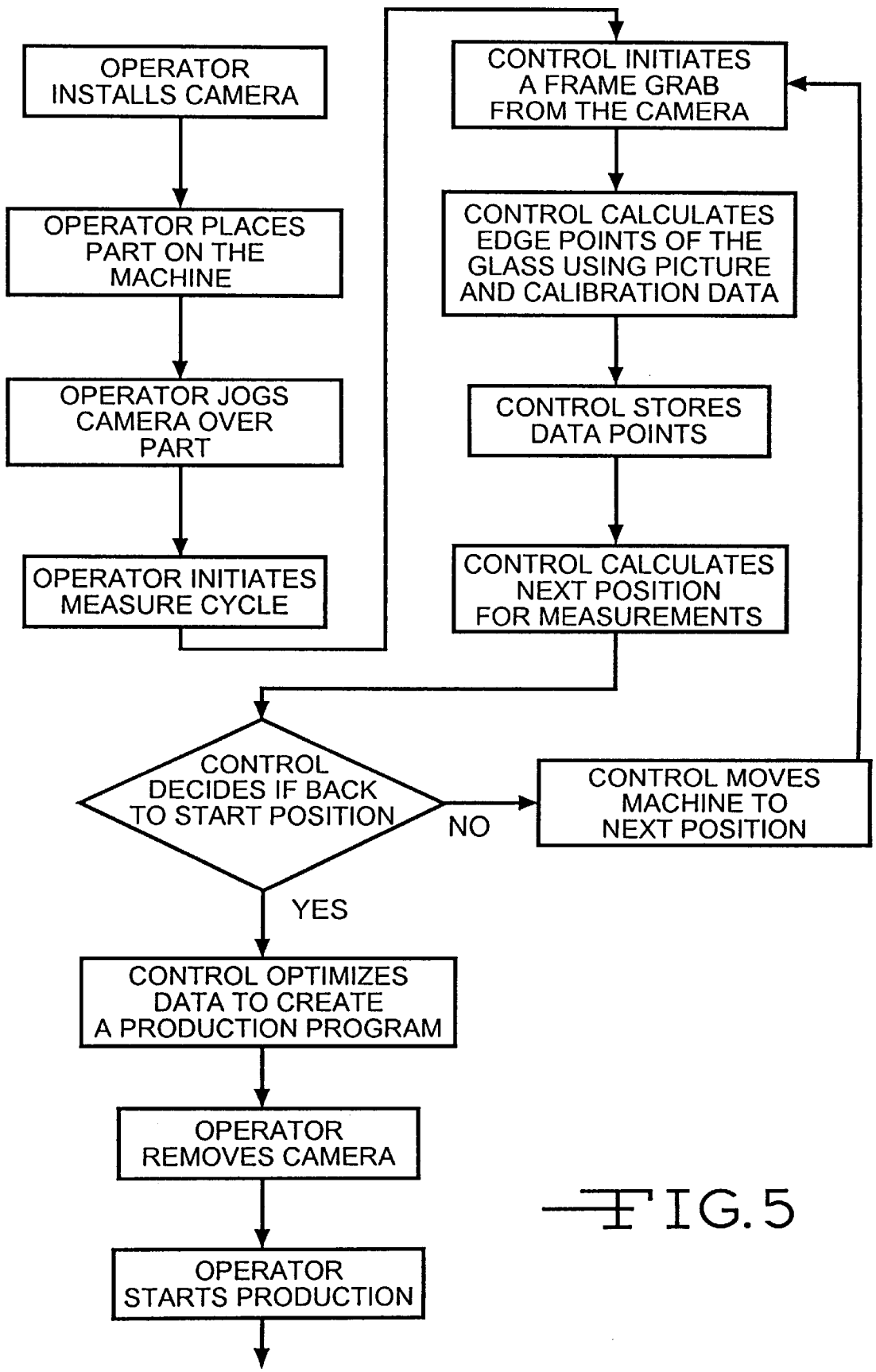
FIG. 5 is a logical flow chart illustrating the operation of the invention.
Figure 6:
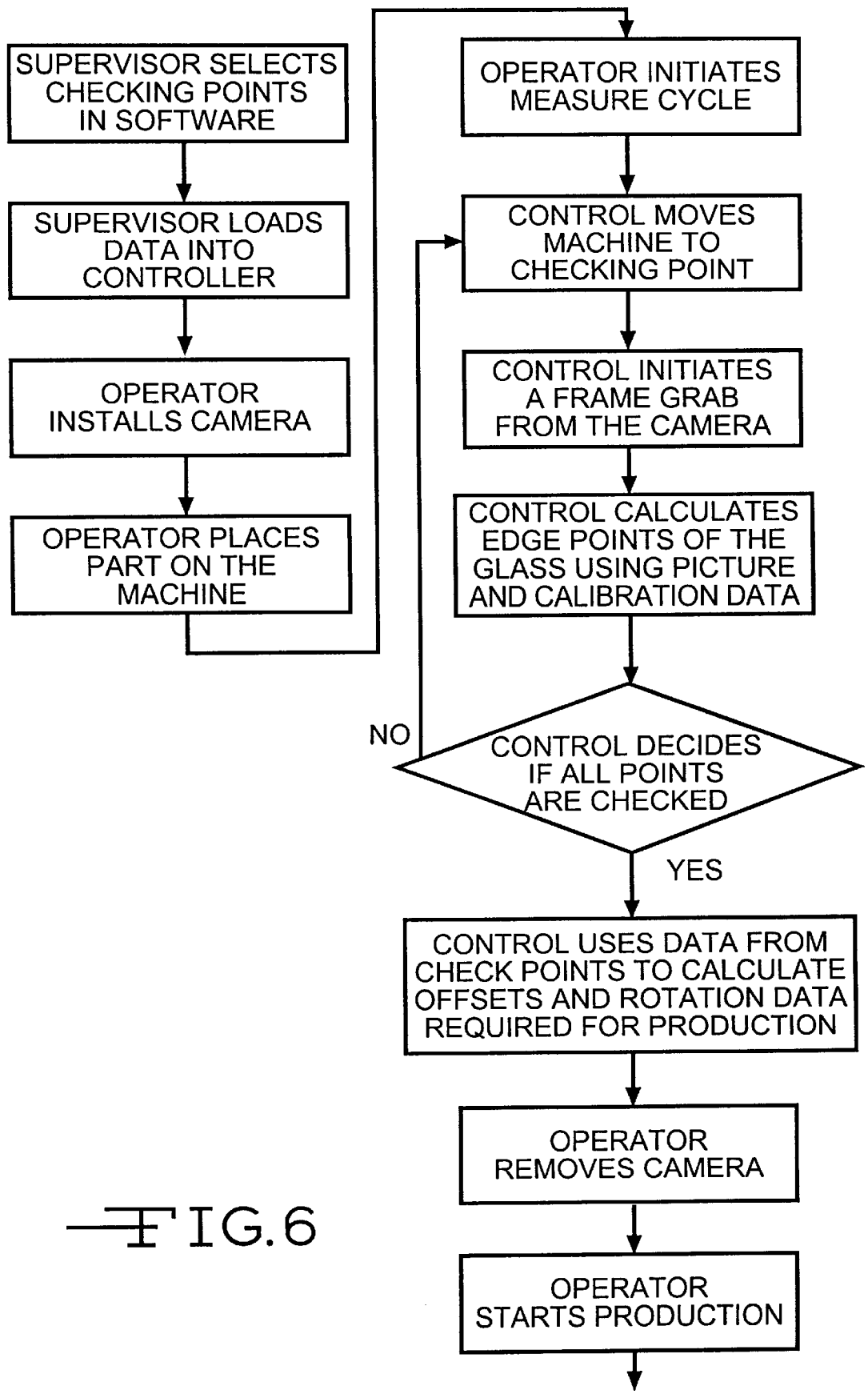
FIG. 6 is a logical flow chart illustrating the operation of the invention.

FIGS. 5 and 6 are logical flow charts illustrating the operation of the video CNC machine. FIG. 5 is the video part location process to establish edge points of blank S. FIG. 6 is the video digiting system to create a production program for moving grinding wheel 34 around the perimeter of blank S. The FIG. 5 and 6 show the step of removing the camera before starting production. In an alternative embodiment, the operator could enclose the camera rather than remove it. These steps are needed merely to keep the camera clean and to prevent damage. Particles from a tooling operation such as edge grinding could interfere with the camera's operation.

CNC apparatus 10 also may include a shuttle with a vacuum pick up unit mounted on linear motion ways. The pick is air cylinder actuated for raising and lowering. The function of the shuttle is to pick up parts from the cutting conveyor, break-out the excess trim of the part, and shuttle the parts to the grinding station. Break-out fingers are used to remove the excess glass around the part; once this operation has been completed the fingers retract to facilitate picking up the part. The lateral movement of the shuttle between the pick up station and the grinder load table is a fixed distance for all parts. Positive stops are provided to slow the cylinder at the end of each stroke and stop the pick up device in an exact location at either end of its travel. This assures positive location of the part in the system.

Edger 36 is a three axis, continuous path CNC edge grinder designed specifically to run auto glass or similar parts. The diamond wheel grinds 360° degrees; after the part is ground, the diamond wheel retracts and the belts raise up to shuttle the part out. Linear motion of the slides is controlled by an A.C. servo motor and a directly coupled, ball type lead screw. Lead screws on both the "X" and "Y" axes are mounted in pre-loaded, angular contact, high thrust type bearings to eliminate all end play. Mounted on the spindle carriage assembly ("X" axis) is a precision grinding spindle directly coupled to a 5 H.P., A.C. drive motor. Also attached to the housing that holds the spindle is a vacuum type coolant guard assembly and rotating mechanism. This assembly consists of the necessary components, bearings, seals, gears and an A.C. servo motor to rotate the guard to keep its slotted opening tangent to the point of grind. The vacuum coolant guard also contains a coolant spray ring which directs coolant to the diamond wheel. When grinding, coolant is piped to this ring from an external supply. The rotating feature of this assembly comprises the third axis of the machine. The diamond wheel is mounted on a motorized, balanced, variable speed spindle.

As table 50 and blank S move towards stop 52', the endless motion of grinding wheel 36 circumscribes a portion of the periphery of the blank. As table 50 and the blank reverse direction, grinding wheel 36 continues on its path about the periphery of blank S. When table 50 stops a stop 52, the grinding path is complete.

The CNC electrical cabinet consists of all components necessary to control the compact system. In the main enclosure is housed the CNC controller, servo amplifiers, the program logic controller and the adjustable frequency A.C. motor drives and other components necessary for the manual and automatic operation of the compact system. The CNC controller used is a dual CNC continuous path control that controls the X, Y and Z (coolant guard rotation) axes.

The machine is equipped with a vacuum coolant guard and a mist collection system designed to keep coolant off the glass and the machine guards. The vacuum guard itself has a fixed rear section and an easily removable front half; coolant and air are pulled up through the top of the guard and up to the mist collector via flexible hose. Once the grinding cycle is completed, a belt section will raise to convey to glass to the next process. The PLC will control the non-motion functions of the CNC and the table. It will also interface with the line control panel to insure automatic sequencing of the line. In the doors of the panel will be push buttons and selector switches that allow manual and automatic control of the CNC grinder.

In a standard CNC glass grinding machine, an operator must adjust the CNC parameters to allow the CNC machine to grind the part where it is located on the machine. This can be a slow process and is difficult for many operators to master. The prior art process requires the operator to grind a part, check the part for even grind then adjust the X, Y and rotation offset parameters on the CNC control to move the CNC program to match the part location. This normally require many iterations at about 30 to 60 seconds per pass. Operators can easily make errors that may damage the machine or grinding tool and make the process take much longer. Also, operators may make imperfect adjustments during set up causing excess tool wear, lower throughput and lower yields.

By using a video camera and programming check points in the CNC program, the operation can be automated. The CNC machine can then automatically go to the check points and measure the part location. Once the locations are measured, the CNC control can calculate the necessary X, Y and rotation offset parameters. This removes the chance for operator error, increases the accuracy of part position compensation, finds the parameters in one pass and does not waste glass for set up.

I claim:

1. An apparatus for tooling a blank, the apparatus comprising a computer numerically controlled machine having:
    a holder having a blank mounted thereon, the holder having stops or blocks for precisely positioning the blank on the holder;
    a tool assembly including a tool for tooling the blank;
    a plurality of machine members and a plurality of programmable controllers movable under the control of a program to cause relative movement between the tool and the holder so as to cause the tool to move along a programmed path relative to the blank, the plurality of members and controllers including;
    a camera attached to the tool assembly and positioned over the blank;
    a controller that initiates measuring the blank;
    a controller that positions the camera over the blank;
    a controller that initiates a frame grab from the camera;
    a controller that calculates a plurality of points on the blank;
    a device for using and storing the frame grabs and calculates points;
    a control that calculates a new position for the camera;
    a control that positions the camera over the next point;
    a control that repeats the steps until a plurality of points on the blank is reacted; and
    a control that initiates tooling of the blank using the calculated points from the frame grabs.

2. An apparatus according to claim 1 wherein the tool assembly includes a housing and the camera is attached to the housing.

3. An apparatus according to claim 2 wherein a quick disconnect fastener attaches the camera to the housing.

4. An apparatus according to claim 3 wherein the quick disconnect fastener is a pair of co-operating mounting plates, one plate being attached to the housing and one plate being attached to the camera.

5. An apparatus according to claim 4 wherein one plate includes precision alignment pins and one plate includes precision alignment holes.

6. An apparatus according to claim 5 wherein the pins of one plate engage a portion of the holes of one plate when the camera is attached to the housing.

7. An apparatus according to claim 6 wherein one plate includes slots to facilitate the attachment.

8. An apparatus according to claim 1 wherein the holder is a rotatable holder or a multi-axis, linear holder.

9. An apparatus according to claim 1 wherein the tool is an edge grinder.

10. An apparatus according to claim 1 wherein the blank is a sheet of glass.

11. An apparatus according to claim 1 wherein the camera is a video camera.

12. An apparatus according to claim 1 wherein the blank has an irregular edge.

13. A process for establishing data for a programmed path for tooling a blank comprising the steps of providing a computer numerically controlled machine having a holder thereon, the holder having stops or blocks for precisely positioning a blank on the holder, a tool assembly including a tool for tooling the blank, and a plurality of machine members and a plurality of programmable controllers moveable under the control of a program to cause relative movement between the tool and the holder so as to cause the tool to move along a programmed path relative to the blank;
    placing a blank on the holder;
    attaching a camera to the tool assembly and positioning it over the blank;
    initiating a measuring cycle of the blank;
    positioning the camera over a point on the blank;
    initiating a frame grab from the camera;
    calculating a plurality of points on the blank;
    storing the frame grabs and calculated points;
    calculating a new position for the camera;
    positioning the camera over the next point;
    repeating the steps until a plurality of points on the blank are reached; and
    initiating the tooling of the blank using the calculated points from the frame grabs.

14. A process according to claim 13 wherein the step of tooling the blank is the step of edge grinding a glass blank with an edge grinder.

15. A process according to claim 14 wherein initiating a frame grab is the step of taking a video recording from a video camera.

16. A process for tooling a blank comprising the steps of providing a computer numerically controlled machine having a holder thereon, the holder having stops or blocks for precisely positioning a blank on the holder, a tool assembly including a tool for tooling the blank, and a plurality of machine members and a plurality of programmable controllers moveable under the control of a program to cause relative movement between the tool and the holder so as to cause the tool to move along a programmed path relative to the blank;
    placing a blank on the holder;
    loading the data for a programmed path calculated from frame grabs of a camera into a controller;
    attaching a camera to the tool assembly and positioning it over the blank;
    initiating a measuring cycle of the blank;
    moving the camera to a check point on the blank;
    initiating a frame grab from the camera;
    calculating a path using frame grabs and calculated points;
    checking points with established data for programmed path;
    using data from check points to calculate offsets and tool path;
    removing camera; and
    starting a tooling process on the blank.

17. A process according to claim 15 wherein the tooling process is the process of edge grinding a glass blank with an edge grinder.

18. A process according to claim 16 wherein initiating a frame grab is the step of taking a video recording from a video camera.

* * * * *